United States Patent
Kuhn et al.

(10) Patent No.: US 11,036,346 B2
(45) Date of Patent: Jun. 15, 2021

(54) METHOD FOR OPERATING AN OPERATING SYSTEM AND OPERATING SYSTEM

(71) Applicant: VOLKSWAGEN AKTIENGESELLSCHAFT, Wolfsburg (DE)

(72) Inventors: Mathias Kuhn, Berlin (DE); Indra-Lena Kögler, Berlin (DE); Filip Piotr Chudzinski, Hamburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/348,521

(22) PCT Filed: Oct. 17, 2017

(86) PCT No.: PCT/EP2017/076454
§ 371 (c)(1),
(2) Date: May 9, 2019

(87) PCT Pub. No.: WO2018/086826
PCT Pub. Date: May 17, 2018

(65) Prior Publication Data
US 2020/0058150 A1    Feb. 20, 2020

(30) Foreign Application Priority Data
Nov. 10, 2016 (DE) ..................... 10 2016 121 561.9

(51) Int. Cl.
*G06F 3/0488* (2013.01)
*G06F 3/0481* (2013.01)
(Continued)

(52) U.S. Cl.
CPC .......... *G06F 3/0481* (2013.01); *G06F 3/0482* (2013.01); *G06F 3/04883* (2013.01);
(Continued)

(58) Field of Classification Search
CPC ............ B60K 2370/1438; B60K 37/06; B60K 35/00; G06F 2203/04802
See application file for complete search history.

(56) References Cited

U.S. PATENT DOCUMENTS

| | | | |
|---|---|---|---|
| 9,754,398 B1* | 9/2017 | Cardwell | G06F 1/1694 |
| 2011/0164042 A1* | 7/2011 | Chaudhri | G06F 3/04845 |
| | | | 345/473 |

(Continued)

FOREIGN PATENT DOCUMENTS

| | | |
|---|---|---|
| DE | 102007039444 A1 | 2/2009 |
| DE | 102008034507 A1 | 1/2010 |

(Continued)

OTHER PUBLICATIONS

Search Report for International Patent Application No. PCT/EP2017/076454; dated Nov. 29, 2017.

*Primary Examiner* — Samantha (Yuehan) Wang
(74) *Attorney, Agent, or Firm* — Barnes & Thornburg LLP

(57) ABSTRACT

A method for operating an operating system which generates and displays a graphical user interface. The graphical user interface includes a first representation with a front side representation of a planar graphical object. An operating action for the graphical object is detected and a transition animation is generated and displayed. Following the transition animation, a second representation with a rear side representation of the graphical object is displayed, the transition animation includes a rotation, shown in perspective, of the graphical object about an axis, and the rear side representation of the graphical object assuming a smaller area than the front side representation. The second representation also includes an information region, and the representation of the graphical object is made smaller during (Continued)

the transition animation. Also disclosed is an operating system having a control unit, a display surface, and a detection unit.

12 Claims, 4 Drawing Sheets

(51) Int. Cl.
  *G06F 3/0482* (2013.01)
  *G06T 13/80* (2011.01)
(52) U.S. Cl.
  CPC .......... *G06T 13/80* (2013.01); *B60K 2370/11* (2019.05); *B60K 2370/165* (2019.05)

(56) References Cited

U.S. PATENT DOCUMENTS

| | | | |
|---|---|---|---|
| 2011/0187749 A1* | 8/2011 | Dehmann | G06F 3/04842 345/649 |
| 2013/0194308 A1 | 8/2013 | Privault et al. | |
| 2013/0215153 A1* | 8/2013 | Park | G06F 1/1694 345/650 |
| 2014/0201653 A1 | 7/2014 | Han et al. | |
| 2019/0005733 A1* | 1/2019 | Wehner | G06F 3/038 |

FOREIGN PATENT DOCUMENTS

| | | | | |
|---|---|---|---|---|
| EP | 2924551 A1 * | 9/2015 | .......... | G06F 3/0488 |
| EP | 2924551 A1 | 9/2015 | | |

\* cited by examiner

METHOD FOR OPERATING AN OPERATING SYSTEM AND OPERATING SYSTEM

PRIORITY CLAIM

This patent application is a U.S. National Phase of International Patent Application No. PCT/EP2017/076454, filed 17 Oct. 2017, which claims priority to German Patent Application No. 10 2016 121 561.9, filed 10 Nov. 2016, the disclosures of which are incorporated herein by reference in their entireties.

SUMMARY

Illustrative embodiments relate to a method for operating an operating system, in which a graphical user interface is created and displayed, wherein the graphical user interface comprises a first representation with a front side representation of a two-dimensional graphical object. A user action for the graphical object is detected, and a transition animation is generated and displayed. Furthermore, following the transitional animation a second representation with a rear-view representation of the graphical object is displayed. The transition animation comprises a rotation, shown in perspective, of the graphical object about an axis and the rear side representation of the graphical object occupies a smaller area than the frontal representation. Illustrative embodiments relate to an operating system, in particular, in a transportation vehicle, having a control unit by which a graphical user interface can be generated. The graphical user interface comprises a first representation with a frontal representation of a two-dimensional graphical object. The operating system also comprises a display area, by which the graphical user interface can be displayed, and a detection unit, by which a user action for the graphical object can be detected. In addition, a transition animation can be generated and displayed, wherein, following the transition animation, a second representation with a rear-view representation of the graphical object can be displayed. The transition animation comprises a rotation, shown in perspective, of the graphical object about an axis and the rear-view representation of the graphical object occupies a smaller area than the frontal representation.

BRIEF DESCRIPTION OF THE DRAWINGS

Disclosed embodiments will now be explained with reference to the drawings, in which.

DETAILED DESCRIPTION

Figure 1:
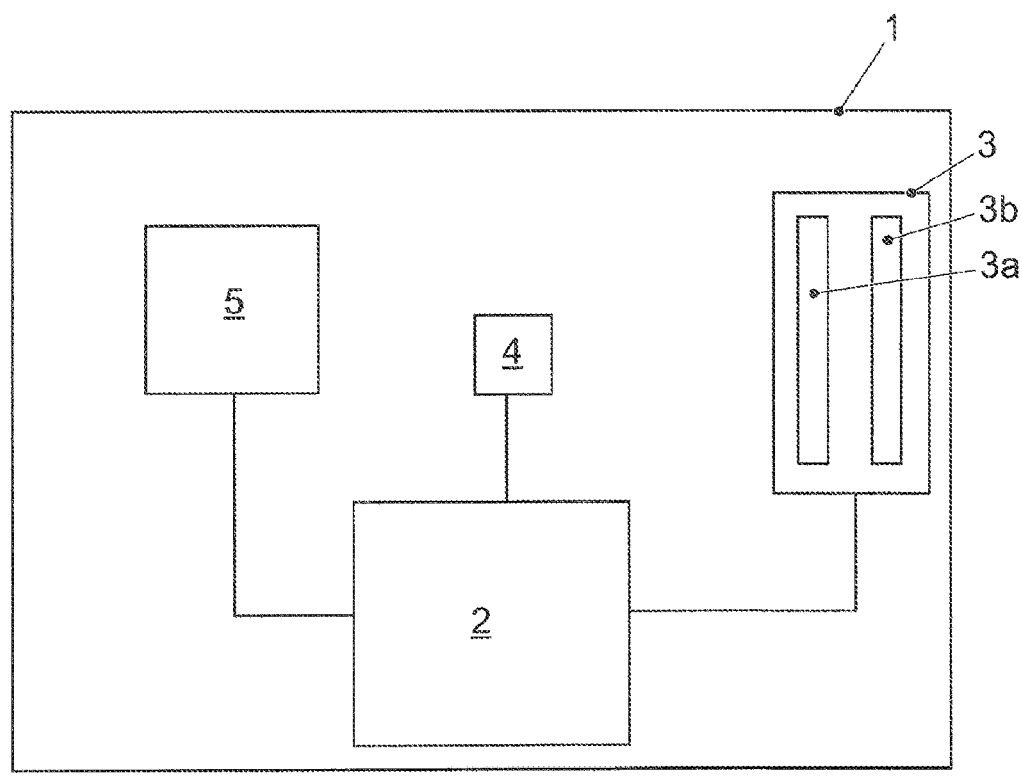
FIG. 1 shows an exemplary embodiment of the disclosed operating system in a transportation vehicle.

The increasing integration of electronic devices into modern everyday life, in particular, also in transportation vehicles, leads to a large demand for facilities for displaying information and providing the user with input and control facilities. This is carried out using displays and touchscreens, which due to decreasing costs and advances in their technical development are now being provided in increasingly large sizes. They not only allow the output of data for various devices, but also the control of these devices by capturing user input.

For example, to be able to operate various electronic devices, multi-function operating systems are often used, which comprise one or more multi-function displays and control elements with which various devices can be operated and which often allow extensive configuration options. The operation is supported or guided by the information reproduced on the multi-function display. Such an operating system can also be used to select which information should be displayed on the multi-function display.

In US 2013/0194308 A1 a user interface is described, in which a widget has a plurality of virtual pages. Conditions for different functions can be displayed on various pages by turning the widget.

Document EP 2 924 551 A1 also proposes a method for providing a graphical user interface, in which a user interface with tiles is displayed. Such a tile of the user interface can be rotated to access a settings menu.

The problem with known systems is to provide the large number of displayable types of information and control options in a rational and clearly structured manner, as well as to ensure a simple way of applying the settings.

Disclosed embodiments provide a method of operating an operating system and an operating system, which allow a simple operation, in particular, for recording settings.

The disclosed method is characterized in that the representation of the graphical object is minimized during the transition animation and the second representation also comprises an information area.

In the method two different sides of the two-dimensional object may be displayed, while different information can be output and different control options can be provided. In doing so a connection between the contents of the data output on the two sides can be clearly presented.

In addition, the area which the rear side representation of the graphical object occupies following the transition animation is reduced in size, and a free area can be formed in which other elements of the display can be provided.

By the information region, an area is also provided that can be used for the output of information.

The basic idea of the present disclosure is based on the concept of a two-side logic. Here, for every first side there exists a second side on which different information can be displayed according to a specific criterion. In general, the first side can also be designated synonymously as the front side and the second side as the rear side, wherein the rear side related to a front side can be formed in a number of different ways. The association of the two sides is illustrated by the representation of a two-dimensional graphical object, wherein a virtual object is displayed, which has virtually no thickness, but only a two-dimensional area.

The two-dimensional graphical object, in particular, its front side, can be implemented as a display window, in particular, as a so-called "tile", or widget object. It extends over a region of the display area, wherein it can occupy the entire display area. In the disclosed method, the graphical user interface can comprise a plurality of two-dimensional graphical objects, wherein multiple graphical objects can be displayed in the display area at once, for example, multiple tiles or widget objects.

A "widget object," for purposes of the disclosure, is understood to mean an object which is displayed graphically on the display area and associated with an application, which is executed, for example, by a device of a transportation vehicle. A widget object may display, in particular, in a small region of the display area, information from a device which is continuously updated. For example, a widget object in a transportation vehicle can display route information of a navigation system, the latest news about the weather, road conditions and traffic conditions, as well as information about multimedia and/or communication equipment. The widget object is displayed independently of the other display content of the display area. If the widget object is displayed as a display window, graphical objects in the display window can be widget objects in turn. In this case, the user has access to other widget objects via the display window.

The detection of the user action for the graphical object is carried out in a known manner, wherein a touch-sensitive surface of a touchscreen is provided. The touchscreen comprises a display surface and a touch-sensitive surface arranged above it, for example, a film, with which the position of a contact by an activation object, in particular, a fingertip of a user, can be detected. The film can be designed, for example, as a resistive touch film, a capacitive touch film, or a piezoelectric film. In addition, the film can be designed so that a heat flow emanating from a user's fingertip, for example, is measured. From the temporal course of the contact with the film, various inputs can be obtained. For example, in the simplest case, touching the film at a particular position can be detected and assigned to a graphical object displayed on the display area.

Since according to the disclosure the rear side representation of the graphical object occupies a smaller area than the front side representation, the second representation can be composed in such a way that the area occupied by the graphical object, smaller in comparison to the first representation, produces a free area of the graphical user interface within which the information area can be displayed. Information output as text is displayed in the information area. Alternatively or in addition, icons and/or pictorial representations can be displayed in the information area.

The elements shown in the information area of the display do not comprise any control facilities, but only information, for example, a piece of text, which informs a user about the control facilities.

The information area is presented in such a way that it does not extend over the area of the rear side representation of the graphical object. The information area is formed adjacent, for example, laterally adjacent, to the rear side representation. The information area can be formed based on different parameters, for example, depending on the identity of the user, on the graphical object whose rear side representation is shown in the second representation, or on a status of the operating system, such as a currently running program or a driving situation of a transportation vehicle.

In at least one exemplary embodiment of the disclosed method, the user action comprises a tapping gesture on a touch-sensitive surface. This allows a particularly simple form of operation.

A "tapping gesture" in this case comprises touching the touch-sensitive surface at a specific position, which can be assigned to a location of the graphical user interface being displayed. In contrast to a "swiping gesture" the intention here is that the position does not substantially change during the duration of the contact.

In doing so it is determined whether the assigned location of the displayed graphical user interface corresponds to a displayed graphical object or to an element of the user interface which is associated with the graphical object. For example, it can be determined whether or not the touch is detected at the position of a button or a control element of the graphical object, or at the location of another area associated with the graphical object.

A "button" is understood, for purposes of the disclosure, to mean a control element of a graphical user interface. A button differs from elements and areas intended for pure information display, so-called display elements or display areas, in the fact that it can be selected. In the event of a button being selected an assigned function is executed. The function can lead, for example, to a change in the information display. Devices can also be controlled via the button, the operation of which is supported by the information display. The button can therefore replace a conventional mechanical switch. It can be created in any form for a freely programmable display area and be displayed by this.

A duration of the detected touch event is determined, the time interval between the beginning and the release of the touch being determined. At least one threshold value can be defined, which indicates a lower and/or upper limit for the duration of the contact detected as a user action.

The duration of the contact can then be taken into account in the evaluation of the detected user action, for example, to distinguish between a short tap and a so-called "long press", in which a prolonged touching of the touch-sensitive surface is detected. It is thus possible to distinguish between different user actions based on touches of different durations.

It is also possible to take into account whether the tapping gesture was carried out with a specific activation object, in particular, with one, two or more fingers. In addition, gestures can be detected, wherein the position of the contact changes over time and a motion sequence from a start position to an end position is thus defined, for example, in the case of a swipe gesture or other gestures.

In other exemplary embodiments the user action can be alternatively or additionally detected by a touch pad, a mouse, a rotary pressure actuator, a keyboard, a switch or other control element.

The transition animation, following which the second representation appears, comprises successive intermediate images generated in an already known manner, which lead to an animation of the change in the representation of the graphical object. The transition animation is generated and displayed such that a transition from the first representation with the front side representation to the second representation with the rear side representation is presented as a movement of the two-dimensional graphical object in a virtual space.

The transition animation then comprises a rotation, shown in perspective, about an axis so that a transition of the representation of the front side to the rear side is achieved. In other words, a rotation about an axis in the plane of the display area is displayed.

In one extension, the rear side representation comprises control elements arranged in an ordered list. On the basis of an activation of a control element, a user input is detected. This allows a selection of a list entry from the list on the basis of the control element.

The entries in the list, each of which is assigned a control element, can be associated with settings of the operating system. Programs can also be assigned to the entries, in particular, application programs. On the selection of a list entry, the respective setting and/or program can be selected and, for example, enabled or launched.

In one extension, a return animation, shown in perspective, for the graphical object is also created and displayed. Following the return animation a front side view of the graphical object is displayed, which is modified depending on the selected control element. This allows a change to be made in the front side representation based on the selection, wherein the second representation is used for the selection.

The return animation is formed in the same way as the transition animation. In this case, the return animation can be the transition animation running in reverse. For example, if the transition animation comprises a rotation about an axis in a first direction, the return animation can comprise a rotation about the same axis in the opposite direction. It can also be provided that the return animation is formed as a continuation of the transition animations, for example, by the transition animation comprising a rotation of 180° about an axis and the return animation comprising a rotation of a further 180° in the same direction and about the same axis. In addition, the return animation can be formed in other ways, for example, by a rotation around a different axis.

Following the return animation the front side representation of the graphical object is displayed, albeit changed depending on a user action which was detected during the display of the second representation with the rear side representation of the graphical object. The front side representation after the completion of the return animation is formed as a function of the selected control element during the rear side representation. For example, a setting assigned to the control element can be made and the front side representation can be modified according to the setting.

It may also be provided, however, that the front side representation is displayed unchanged, so that after the completion of the return animation, a return to the front side representation of the graphical object is carried out, as it had previously been displayed before the display of the transition animation.

In one design an application program is associated with the graphical object, and output data of the associated application program are displayed by the front side representation of the graphical object. In addition, on the basis of the second display a selection action can be detected, wherein on the basis of the selection action a different application program is associated with the graphical object. Thus a configuration of the graphical object can be performed to select a specific displayed application program. The rear side representation of the graphical object is used to select the information represented on the front side. For example, on the basis of a selected control element of the rear side representation a specific application program can be launched and/or associated with the graphical object, wherein after the return animation the front side representation comprises the output of output data of the application program.

In another design, the axis of rotation of the transition animation during the transition animation and/or the return animation is oriented horizontally. This allows the rotation to be performed in a particularly simple manner. In the case of a further design, the axis is oriented vertically.

The axis passes through the center of the graphical object, wherein in the case of a horizontal axis the graphical object is divided into an upper half and a lower half. The axis of rotation can also be formed dynamically, which means that the position of the axis in the representation can be variable with time, for example, by the axis being moved during the rotation.

In an extension, the axis of rotation of the transition animation and/or of the return animation is displaced in one direction during the rotation and at the same time, a rotation of the graphical object is generated and displayed. The displacement of the axis can be linearly synchronized with the rotation of the graphical object. During a rotation of the graphical object from the front side to the rear side representation, the axis of rotation shifts from one side to an opposite side of the graphical object, for example, from left to right. The displacement of the axis takes place in a direction perpendicular to the extension direction of the rotation axis, for example, in the vertical direction in the case of a horizontally oriented axis.

The animation of the rotation of the graphical object in this case is composed of two transformations: firstly, the axis of rotation moves in one direction, in particular, in the vertical direction, and secondly, a rotation of the graphical object is carried out about this axis, in particular, a horizontal axis. For the nature of the coupling between these two movements there are different possibilities. It is provided that a vertical displacement of a horizontal axis may be linearly synchronized with the rotation of the graphical object.

It can be provided that the displacement of the axis of rotation is not performed with constant speed, but one phase is formed with an acceleration and one phase with a deceleration of the displacement. In this way, a uniform rotation speed for the graphical object can be generated while the axis is being moved.

In a further design the transition animation and/or the return animation additionally comprises a displacement of the graphical object in the plane of the graphical user interface. It comprises a lateral displacement. This allows a transition from the first to the second representation to be generated in such a way that during the rear side representation, which occupies a smaller area than the front side representation, an area is created for presenting further objects.

In a further disclosed embodiment, during the transition animation the graphical object can be displaced laterally in such a way that a lateral area appears, and the information area is displayed in the resulting lateral area. As a result, a space may be created for outputting additional information in the information area.

The displacement of the graphical object during the transition from the first to the second representation or during the return animation can be formed in different ways, for example, as a lateral displacement or a displacement in multiple directions. The displacement can be carried out as a translation along a straight line in a certain direction, or the animation can specify a non-linear path for the displacement.

In one design the transition animation and/or the return animation comprises an enlargement and/or reduction of the distance of the graphical object, shown in perspective, in a direction perpendicular to the plane of the graphical user interface. This allows a perspective representation to be formed, in such a way that an enlargement or reduction in size of the area occupied by the graphical object is generated on the basis of a spatially represented distance.

In a perspective representation, a change in the displayed distance from the observer to the graphical object leads to a change in size. The graphical object increases in size when it is displayed at a shorter distance from the observer and reduces in size when it is displayed at a greater distance. This allows an enlargement or reduction by displaying a change in distance, in particular, in a direction perpendicular to the plane of the graphical user interface. In doing so, the representation can take place in an already known manner as a "zoom", wherein an enlargement and reduction can be represented on the basis of a "zoom factor". For example, during the transition and/or return animation it is possible to represent the graphical object moving in a direction perpendicular to the graphical user interface, in other words, typically in a direction away from a viewer of the graphical user interface (zooming out) or towards the viewer (zooming in).

For example, it can be provided that a brief zooming out followed by a zooming in can be performed in the transition animation. If different zoom factors are used, then due to this difference an enlargement or reduction can exist at the end of the transition animation.

For example, in the transition animation the graphical object can be reduced in a first operation by zooming out, for example, with a first zoom factor, and enlarged in a second operation by zooming in, for example, with a second zoom factor. If the first zoom factor leads to a greater reduction in size than the second zoom factor leads to an enlargement of the graphical object, this results in a size reduction. The return animation can be created in a similar way, for example, with the reverse sequence of the transition animation, wherein the zoom factors are chosen such that at the end of the return animation the graphical object is again displayed with the original size of the front side representation.

For the transition animation and/or the return animation at least three movement operations can be coupled, namely a rotation of the graphical object about an axis, a displacement in a direction parallel to the plane of the user interface and a change in the distance in a direction perpendicular to the plane of the user interface, which in turn leads to a change in the apparent size of the graphical object. These three elements of the displayed movement can be connected in various ways and synchronized, so that at the end of the transition animation the rear side representation is output with a smaller area than that of the front side representation, or at the end of the return animation the front side representation is obtained again.

In an extension the transition animation and/or the return animation additionally comprises a light effect, wherein a brightness parameter of the graphical object is changed for the duration of the transition animation or return animation. This allows the representation to be supported by a light effect. The brightness parameter comprises a displayed brightness of the graphical object. In addition, further elements of the graphical user interface can have a brightness.

For example, it can be provided that in a first phase, the transition animation comprises a reduction of the displayed brightness of the graphical object, and in a second phase, an increase in the brightness. Also, conversely an increase can be provided first, followed by a reduction in the brightness.

In a further design it can be provided that the light effect is either not generated or not only for the duration of the transition animation, but that a change in the brightness parameter of the graphical object in the second representation will change compared to the first representation.

Alternatively or additionally, a change in the brightness of other elements of the graphical user interface can be provided. For example, during the first representation a uniform brightness of the graphical user interface can be produced, while during the second representation the rear side representation of the graphical object is highlighted by reducing the brightness of the rest of the graphical user interface and/or thereby highlighting the rear side representation by higher brightness.

The light effect can be produced in other known ways and comprise other parameters, for example, a color parameter.

In an extension, the transition animation from the first representation to the second representation is displayed with a duration of 0.1 to 0.5 seconds. In addition, the return animation can be displayed with a duration of 0.1 to 0.5 seconds or for the same duration as the transition animation. This has the benefit that an easily perceptible transition can be displayed.

The duration with which the animations are displayed, as well as the dynamics of the sequence of the displayed animation, can either be permanently specified or variable, for example, depending on a transportation vehicle speed. In this way it is possible to take into account, for example, if a fast transition should be presented at a higher transportation vehicle speed to place the briefest possible demand on the attention of the user.

The disclosed operating system is characterized in that the second representation also comprises an information area and the representation of the graphical object can be reduced in size during the transition animation.

The disclosed operating system is designed to implement the above described method. The operating system therefore has the same benefits as the disclosed method.

In at least one exemplary embodiment of the disclosed operating system, the detection unit and the display area are comprised by a touch screen. This allows a particularly simple and compact design of the operating system.

With reference to FIG. 1 an exemplary embodiment of the disclosed operating system in a transportation vehicle will be described.

A transportation vehicle 1 comprises a control unit 2, to which a touch screen 3, a detection unit 4 and a computing unit 5 are linked. The detection unit 4 in the exemplary embodiment is formed as a rotary pressure actuator 4. Touch screen 3 comprises a touch-sensitive surface 3a, which is also used as a detection unit 3a, as well as a display area 3b. The touch-sensitive surface 3a is designed as a touch film, which is arranged above the display area 3b.

With reference to FIGS. 2A to 2D, a first exemplary embodiment of the disclosed method will be described. This will be based on the exemplary embodiment of the operating system which was described above with reference to FIG. 1.

In the exemplary embodiment, by the computing unit 5, graphical data of a graphical user interface are generated and transmitted by the control unit 2 to the touch screen 3, wherein on the basis of the graphical data a display is output on the display area 3b of the touch screen 3. FIGS. 2A to 2D show the display area 3b with the output of the graphical user interface.

Figure 2A:
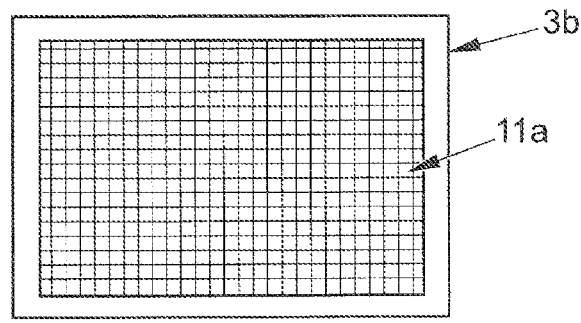
FIGS. 2A to 2D show a first exemplary embodiment of the disclosed method.

In the case shown in FIG. 2A the graphical user interface output on the display area 3b comprises a front side representation 11a of a graphical object, wherein for ease of recognition the display area 3b is not completely filled. In another exemplary embodiment, the front side representation 11a can fill the entire display area 3b or the graphical user interface can comprise a plurality of graphical objects, in particular, a plurality of graphical objects that are similar to the graphical object shown in FIG. 2A.

The graphical object is represented as a view of a two-dimensional virtual object, which means that it has a front side and a rear side, wherein the thickness of the graphical object is virtually non-existent. In the figures the graphical object is represented schematically and by way of example as a rectangle. A front side representation 11a is provided, in which a frontal plan view of the front side of the two-dimensional graphical object is shown. In addition a rear side representation 11b is provided, in which the rear side of the graphical object is displayed at the front.

In the exemplary embodiment it is provided that the front side representation 11a is used to display output data of an application program being executed by the computing unit 5. This output is produced in a known manner, wherein the front side representation 11a is used in the sense of a standard display window or widget object. In the area of the front side representation 11a, graphical elements are provided which are used for displaying information and/or for operation by a user.

The front side representation 11a comprises buttons, by which the user's inputs can be detected. To this end, the touch-sensitive surface 3a of the touch screen 3 and/or the rotary pressure actuator 4 are mainly used, wherein the detection itself is performed in a known manner. A user action is detected by which a change to a rear side representation 11b of the graphical object is triggered, wherein a transition animation is output. The control action can comprise, for example, an activation of a control element or a selection of a button in the graphical user interface. Alternatively or additionally, by the touch-sensitive surface 3 a gesture can be detected, for example, a "long press" gesture, in which, for example, a touch is detected in the area of the front side representation 11a over a specific time interval, a gesture made using multiple fingers and/or a swiping gesture with a particular movement path or in a particular area of the touch-sensitive surface.

Figure 2B:
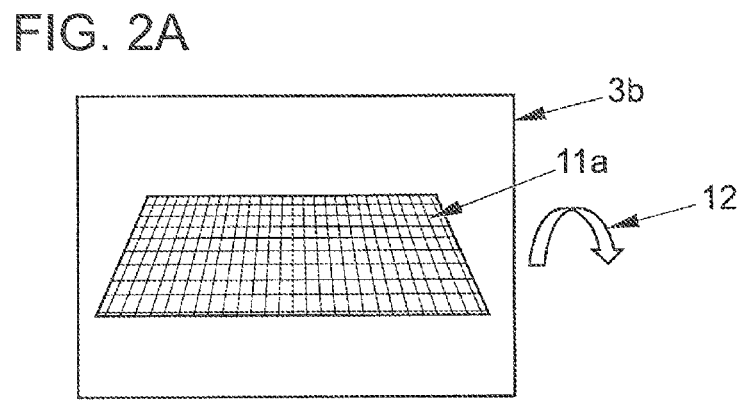
Figure 2C:
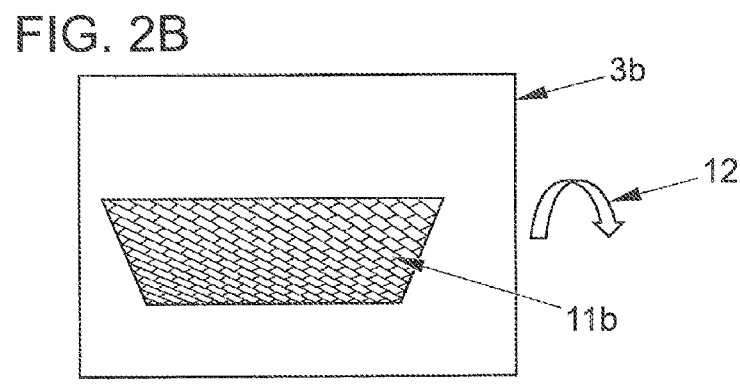
Figure 2D:
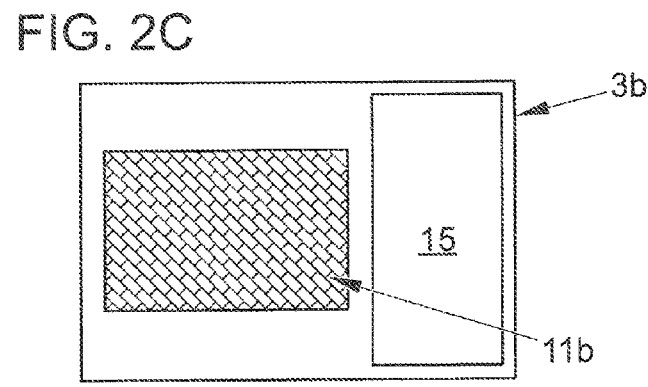

The display with the rear side representation 11b of the graphical object is shown in FIG. 2D, and individual operations of the transition animation in FIGS. 2B and 2C. An arrow 12 implies a representation of a rotation of the displayed graphical object about a horizontal axis arranged in the center of the display area 3b.

Starting from the front side representation 11a of the graphical object on the display area 3b shown in FIG. 2A, in the transition animation a rotation of the displayed virtual two-dimensional graphical object is displayed. In FIG. 2B a perspective view can be seen of the front side of the graphical object with the front side representation 11a while it rotates, while in the case of a more advanced rotation shown in FIG. 2C, a perspective view of the rear side with the rear side representation 11b is already visible.

In the case shown in FIG. 2D a rotation through 180° has been completed and the representation comprises a frontal view of the rear side of the graphical object with the rear side representation 11b. After the end of the transition animation the display comprises an information area 15, which is displayed at the side to the right of the rear side representation 11b of the graphic object. The rear side representation 11b in the display shown in FIG. 2D occupies a smaller area than the front side representation 11a in FIG. 2A, the graphical object is thus reduced in size compared to the case shown in FIG. 2A.

In the exemplary embodiment the transition animation is generated and output such that in the transition from the frontal view of the front side representation 11a of the graphical object to the frontal view of the rear side representation 11b, in addition to the rotation about the horizontal central axis the graphical object is reduced in size and displaced to the left, so that the information area 15 can be displayed at the side to the right of the graphical object. In the exemplary embodiment it is provided that a movement of the graphical object away from the observer is displayed, i.e., in a direction perpendicular to the plane of the graphical user interface "into the display area", so that a perspective reduction takes place. At the same time, a displacement of the graphical object to the left is displayed, so that a free space is created on the right-hand side for the information area 15.

In the exemplary embodiment it is provided that in the area of the rear side representation 11b of the graphical object buttons are displayed that are assigned to different application programs. An activation of a button is detected and the application program associated with the actuated button is activated and assigned to the button. Output data generated by the application program are then displayed when the front side representation 11a of the graphical object is displayed. In the exemplary embodiment the information area 15 comprises information, displayed as text, about which programs can be selected using the rear side representation 11b. This part of the exemplary embodiment of the disclosed method is explained in further detail below with reference to FIGS. 4A and 4B.

The transition animation may also be formed such that an appearance of the information area 15 is displayed, for example, by a operation-by-operation superposition, a movement of graphical objects associated with the information area 15 into the display area from the outside or in any other known manner, wherein perspective effects can be used.

In the exemplary embodiment a light effect is also provided which is displayed during the transition animation. This involves a brightness parameter of the graphical object being changed for the duration of the transition animation. The brightness of the graphical object is first reduced and then increased, so that the rear side representation 11b in the case shown in FIG. 2D has a brightness which is the same as the brightness of the front side representation 11a in FIG. 2A.

In other exemplary embodiments other lighting effects can be provided, for example, through a reduced brightness of other graphical objects of the display, so that the rear side representation 11b of the graphical object and the information area 15 are displayed more brightly relative to other elements of the display. In other embodiments brightness effects can be formed in any other way to achieve a highlighting of the graphical object. Alternatively or in addition to the brightness effect, the light effect displayed can also relate to further parameters, for example, a color change, a dynamic representation, such as by flashing, or a change in the contrast. In addition, the light effect can be generated in the animation for the duration of the display and/or be permanently applied to the display of the graphical object, in particular, the rear side representation 11b.

In the exemplary embodiment it is also provided that in the case shown in FIG. 2D a user input is detected and thereafter a return animation for the graphical object, shown in a perspective view, is created and displayed, wherein a transition from the rear side representation 11b to a front side representation 11a of the graphical object is displayed. In the exemplary embodiment the return animation is formed such that it substantially corresponds to the transition animation sequence in reverse. This means that the rotation, the displayed change in the distance, and the brightness effect are displayed "backwards". It is provided that the transition animation comprises a rotation from 0° to 180°, while the return animation comprises a rotation from 180° to 0°.

In other exemplary embodiments it is provided that the return animation is a continuation of the transition animation, for example, by not reversing a rotation of 180°, but instead continuing it to 360°. In other exemplary embodiments the transition from the rear side representation 11b to the front side representation 11a can also be carried out in other ways, for example, by a rotation about a different axis, for example, a vertically oriented axis. In addition, other elements of the display or animation, such as a brightness effect or the distance shown relative to an observer, can be generated by other methods or mechanisms.

In a further exemplary embodiment it is provided that the axis of rotation is moved during the transition animation at the same time as the graphical object rotates. In this case a displacement of the axis is displayed in a direction which extends perpendicular to the orientation of the axis of rotation. If, for example, as in the exemplary embodiment the rotation axis runs horizontally, then it may be provided that the axis is shifted in the vertical direction during the rotation of the graphical object. In this way, the rotation of the graphical object can be displayed as a tilting movement, so that the transition from the front side representation 11a to the rear side representation 11b is displayed in an elegant and rapidly comprehensible way.

In the exemplary embodiment the transition animation, and accordingly also the return animation, has a duration of 0.1 seconds. In other exemplary embodiments, the duration can be between 0.1 and 0.5 seconds. In other exemplary embodiments, the duration can be formed as a function of parameters of the transportation vehicle operation, for example, as a function of the speed of the transportation vehicle 1. The duration can be shorter the faster the transportation vehicle 1 moves, and the longer the slower the vehicle 1 moves.

With reference to FIGS. 3A to 3D, a second exemplary embodiment of the disclosed method will be described. This will be based on the exemplary embodiment of the disclosed operating system which was described above with reference to FIG. 1.

Figure 3A:
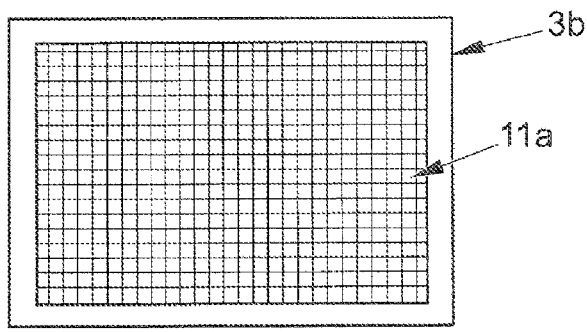
FIGS. 3A to 3D show a second exemplary embodiment of the disclosed method.
Figure 3B:
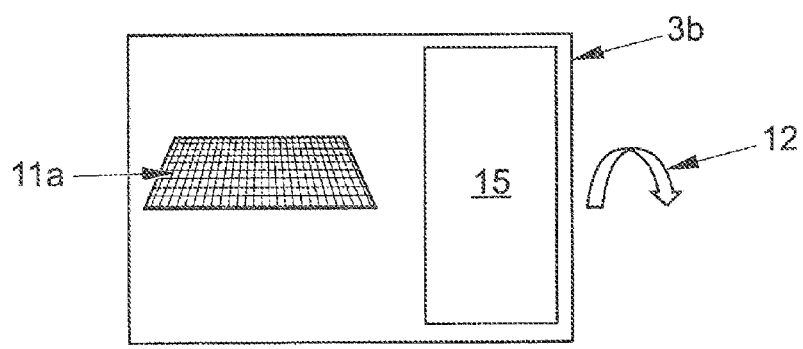
Figure 3C:
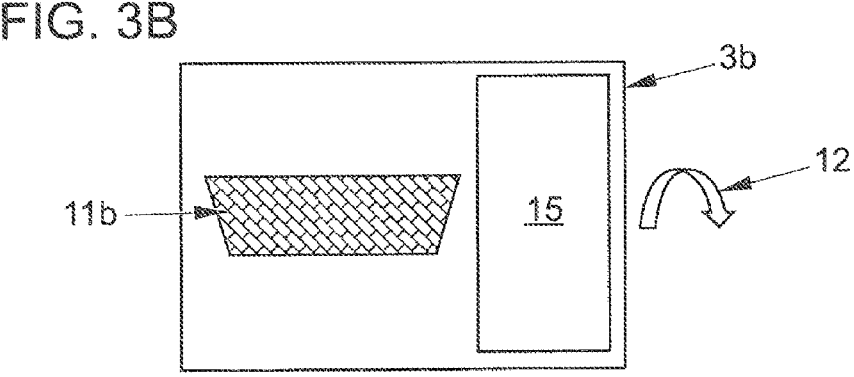
Figure 3D:
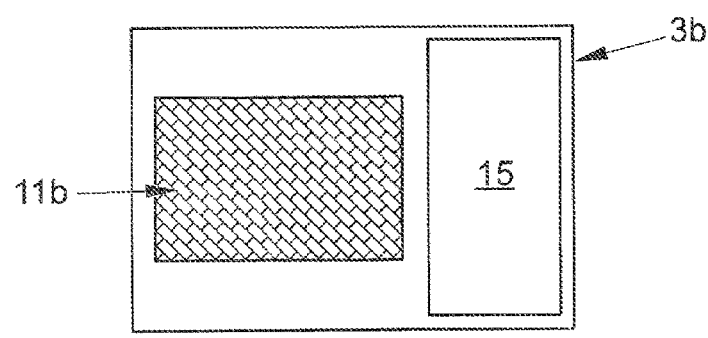

The generation of the graphics data of the graphical user interface and its display on the display area 3b take place in a substantially similar way to the exemplary embodiment of the disclosed method explained above in relation to FIGS. 2A to 2D. However, during the transition animation, some partial operations of which are shown in FIGS. 3B and 3C, a Zoom Out is output first followed by a Zoom In for the graphical object, wherein a front side representation 11a is shown firstly, and a rear side representation 11b of the graphical object is displayed after the transition animation. The transition animation is also generated in such a way that by displacement of the graphical object to the right-hand side of the graphical object, a free area is produced, in which at the end of the transition animation the information area 15 is displayed.

Units of a virtual distance of the displayed two-dimensional graphical object are defined, wherein the virtual distance extends along a direction perpendicular to the plane of the displayed graphical user interface. The units used can be formed in a known way. For example, the transition animation can be created such that a real distance of an object is simulated, the units in this case corresponding to actual length units. Alternatively, arbitrary units can be provided as a parameter for the generation of the graphics data with the graphical object.

In the transition animation of the exemplary embodiment a displacement of the graphical object by 300 arbitrary units in a direction away from the observer into the plane of the graphical user interface is shown first, followed by an approach by 50 arbitrary units in the opposite direction, that is to say, towards the observer. This means that the graphical object is first reduced in size and then enlarged again, wherein after 50% of the transition animation has elapsed the results is a reduction in the area occupied by the graphical object of the second display.

In other exemplary embodiments a zoom factor can be used instead of units of distance, to parametrize the displayed size of the graphical object and/or its virtual distance from the plane of the graphical user interface. In so doing, the zoom factor can be a mapping scale. For example, the zoom factor in the case shown in FIG. 3B can be chosen so that a reduction is made in the size of the graphical object compared with the front side representation 11a shown in FIG. 3A by a factor of 0.5, while the zoom factor in the case shown in FIG. 3C is 0.7 and in the case of the rear side representation 11b shown in FIG. 3D it is 0.8.

This means that in the exemplary embodiment the transition animation comprises an increase and subsequent decrease in the distance of the graphical object from the plane of the graphical user interface, wherein the distance at the end of the transition animation (see FIG. 3D) compared with the starting point (see FIG. 3A) is enlarged, so that the rear side representation 11b occupies a reduced area compared to the front side representation 11a of the graphical object. The free surface area thus available is arranged on the right-hand side of the rear side representation 11b, since in the case of the transition animation a displacement of the graphical object to the left-hand side is also displayed. The information area 15 can therefore be displayed on the right-hand side.

In the exemplary embodiment it is also provided that the return animation is generated and output as the reverse sequence of the transition animation. It is generated as described above with reference to FIGS. 2A to 2D.

In further exemplary embodiments, other zoom factors or other virtual distances may be used.

Figure 4A:
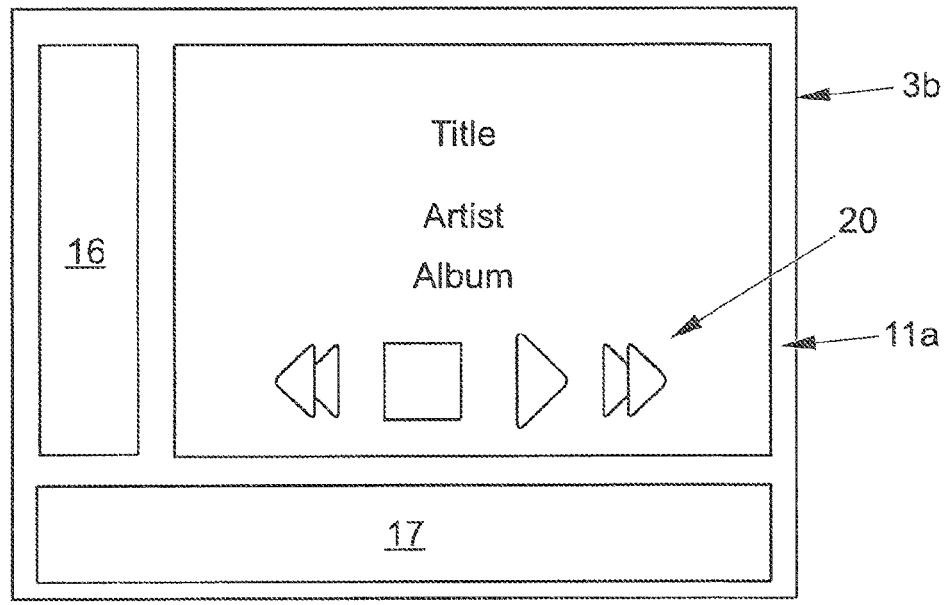
FIGS. 4A and 4B show a third exemplary embodiment of the disclosed method.
Figure 4B:
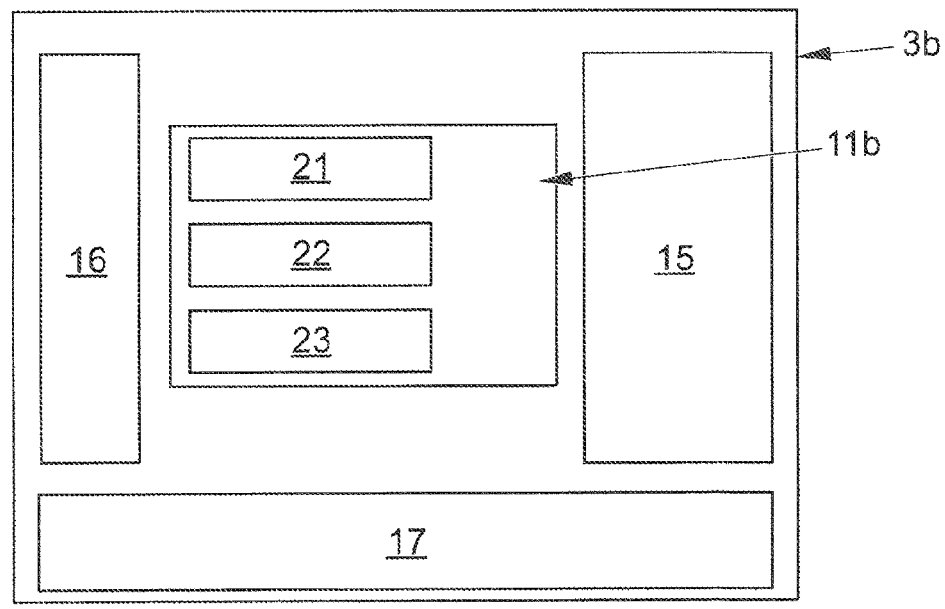

With reference to FIGS. 4A and 4B, a third exemplary embodiment of the disclosed method will be described. This will be based on the exemplary embodiment of the disclosed operating system which was described above with reference to FIG. 1.

The generation of the graphical data of the graphical user interface and its display on the display area 3b take place in a substantially similar way to the exemplary embodiments of the disclosed method explained above in relation to FIGS. 2A to 2D and in relation to FIGS. 3A to 3D. It is provided that a transition animation equivalent to the cases described above is generated and displayed for the transition from the case represented in FIG. 4A to the representation of FIG. 4B.

The graphical user interface output on the display area 3b, however, comprises additional display areas 16, 17 in addition to the graphical object, which is shown in FIG. 4A as a front side representation 11a and in FIG. 4B as a rear side representation 11b. The graphical user interface can be formed in the display areas 16, 17 in a known manner, in particular, graphical elements for outputting information and/or for detecting user input can be provided here.

In further exemplary embodiments, the additional display areas 16, 17 are arranged in different ways, for example, on different sides. In addition, a single additional display area 16, 17 or a plurality of display areas 16, 17 of the graphical user interface can be provided. In other embodiments it can also be provided that in the transition from the case shown in FIG. 4A to the case shown in FIG. 4B the display in the display areas 16, 17 is changed, for example, to display different information and/or to provide different control options.

In further exemplary embodiments, the graphical user interface that is output on the display area 3b can comprise a plurality of graphical objects, which are formed in accordance with the disclosed method and therefore have a front side representation 11 and a rear side representation 11b. These graphical objects can be formed in a known manner as tiles, widget objects or display windows. In further exemplary embodiments, the in the information area 15 can be formed in other ways, for example, on a different side of the rear side representation 11b, as an area wholly or partially surrounding the rear side representation 11b, or as a display window which can be freely positioned.

Also, in this example it is provided that in the front side representation 11a of the graphical object output shown in FIG. 4A, output data of an application program associated with the graphical object are displayed, in this example a media playback program. In the front side representation 11a here buttons 20 are output, which enable the control of the associated application program, in the example shown a control of the playback of a media file. In addition, information about the activity of the application program are output; the example shown in FIG. 4A is an indication of the song title, artist and album of a media file currently being output.

In the rear side representation 11a of the graphical object shown in FIG. 4B it is provided that buttons 21, 22, 23 are output, which are assigned to different application programs. The user can click on a button 21, 22, 23 and thereby assign the respective application program to the graphical object. On returning to the front side representation 11a, which takes place automatically after clicking on a button 21, 22, 23, the output data of the newly associated application program can then be displayed.

In other exemplary embodiments it may alternatively or additionally be provided that settings for the application program associated with the graphical object are assigned to the buttons 21, 22, 23. Here also it can be provided that the return animation is performed automatically by clicking a button 21, 22, 23 and in the subsequent front side representation 11a the output data of the application program are changed in accordance with the new settings.

LIST OF REFERENCE NUMERALS 1 transportation vehicle
2 control unit
3 touch screen
3a detection unit; touch-sensitive surface
3b display surface
4 detection unit; rotary pressure actuator
5 computing unit
10 representation
11a front side representation
11b rear side representation
12 arrow
15 information area
16; 17 display area
20 buttons (front side)
21, 22, 23 buttons (rear side)

The invention claimed is:

1. A method for operating an operating system, the method comprising:
    generating and displaying a graphical user interface, wherein the graphical user interface comprises a first representation with a front side representation of a two-dimensional graphical object;
    detecting a user action for the graphical object;
    generating and displaying a transition animation; and
    displaying a second representation with a rear side representation of the graphical object following the transition animation, wherein the transition animation comprises a rotation of the graphical object about an axis shown in perspective, wherein the rear side representation of the graphical object occupies a smaller area than the front side representation, wherein the representation of the graphical object is reduced during the transition animation and the second representation further comprises an information area, wherein the transition animation comprises a displacement of the graphical object in the plane of the graphical user interface, wherein the graphical object is moved sideways so that a lateral region is produced in the transition animation and the information area is displayed in the resulting lateral region, and wherein the transition animation further comprises a light effect such that a brightness parameter of the graphical object is changed for the duration of the transition animation from a reduced brightness in a first phase to an increased brightness in a second phase.

2. The method of claim 1, wherein the user action comprises a tap gesture on a touch-sensitive surface.

3. The method of claim 2, wherein the duration of a contact with the touch-sensitive surface is taken into account in the evaluation of the detected user action, wherein a distinction is made between a short tap and a long press, in which a prolonged contact with the touch-sensitive surface is detected.

4. The method of claim 1, wherein the rear side representation comprises control elements arranged in an ordered list; and a user input is detected based on an activation of a control element.

5. The method of claim 4, wherein a return animation for the graphical object is created and displayed in perspective; and a modified front side representation of the graphical object is displayed following the return animation depending on the selected control element.

6. The method of claim 1, wherein the graphical object is associated with an application program; and the front side representation of the graphical object is used to display output data of the associated application program.

7. The method of claim 6, wherein a selection action is detected based on the second representation; wherein a different application program is associated with the graphical object based on the selection action.

8. The method of claim 1, wherein the axis of rotation of the transition animation runs horizontally.

9. The method of claim 1, wherein the axis of rotation of the transition animation is displaced in one direction during the rotation and a rotation of the graphical object is generated and displayed at the same time.

10. The method of claim 1, wherein the transition animation from the first representation to the second representation is displayed with a duration of 0.1 to 0.5 seconds.

11. An operating system, comprising:
    a control unit by which a graphical user interface is generated; wherein the graphical user interface comprises a first representation with a front side representation of a two-dimensional graphical object;
    a display surface by which the graphical user interface is displayed; and
    a detection unit by which a user action for the graphical object is detected, wherein a transition animation is generated and displayed, wherein a second representation with a rear side representation of the graphical object is displayed following the transition animation, wherein the transition animation comprises a rotation of the graphical object about an axis shown in perspective and the rear side representation of the graphical object occupies a smaller area than the front side representation, wherein the second representation further comprises an information area and the representation of the graphical object is reduced in size during the transition animation, wherein the transition animation comprises a displacement of the graphical object in the plane of the graphical user interface, wherein the graphical object is moved sideways so that a lateral region is produced in the transition animation and the information area is displayed in the resulting lateral region, and wherein the transition animation further comprises a light effect such that a brightness parameter of the graphical object is changed for the duration of the transition animation from a reduced brightness in a first phase to an increased brightness in a second phase.

12. The operating system of claim 11, comprising the detection unit and the display surface of a touch screen.

* * * * *